US007559735B2

(12) United States Patent
Pruteanu et al.

(10) Patent No.: US 7,559,735 B2
(45) Date of Patent: Jul. 14, 2009

(54) AUTOMATED LOADER

(75) Inventors: Claudiu D. Pruteanu, Kasson, MN (US); Brian R. Meldahl, Brownsdale, MN (US); Randall L. Bice, Rochester, MN (US); Jason M. Gillard, West Concord, MN (US)

(73) Assignee: McNeilus Truck and Manufacturing, Inc., Dodge Center, MN (US)

( * ) Notice: Subject to any disclaimer, the term of this patent is extended or adjusted under 35 U.S.C. 154(b) by 322 days.

(21) Appl. No.: 11/030,823

(22) Filed: Jan. 7, 2005

(65) Prior Publication Data

US 2006/0153667 A1 Jul. 13, 2006

(51) Int. Cl.
*B65G 65/23* (2006.01)

(52) U.S. Cl. ....................... 414/409; 414/421; 414/425; 414/525.1; 414/540

(58) Field of Classification Search ................ 414/409, 414/410, 421, 425, 482, 525.1, 527, 540, 414/541
See application file for complete search history.

(56) References Cited

U.S. PATENT DOCUMENTS 3,087,637 A * 4/1963 Fox ............................ 414/420
4,057,156 A * 11/1977 Thompson et al. .......... 414/408
4,313,707 A 2/1982 Bingman et al.
4,872,801 A * 10/1989 Yeazel et al. ................ 414/409
5,007,786 A 4/1991 Bingman
5,035,563 A 7/1991 Mezey
5,035,564 A * 7/1991 Matsumoto ................. 414/409
5,163,805 A 11/1992 Mezey
RE34,292 E 6/1993 Bingman et al.
5,230,393 A 7/1993 Mezey
5,505,576 A * 4/1996 Sizemore et al. ............ 414/409
5,525,022 A * 6/1996 Huntoon ..................... 414/409
5,651,654 A 7/1997 Christenson
5,702,225 A 12/1997 Ghibaudo
5,769,592 A 6/1998 Christenson
7,086,818 B2 * 8/2006 Pruteanu et al. ............. 414/406

* cited by examiner

*Primary Examiner*—Michael S Lowe
(74) *Attorney, Agent, or Firm*—Nikolai & Mersereau, P.A.; C. C. Mersereau

(57) ABSTRACT

A container handling mechanism suitable for mounting on the side of a refuse vehicle for loading material from refuse containers is disclosed that includes a lift assembly, having a pair of spaced, generally parallel lift support members, attachable to a refuse vehicle, a carriage device reciprocally operable along the lift support members of the lift assembly, a container grabbing system carried by the carriage device and further including a pair of opposed grabber fingers and an actuator system for closing and opening the grabber fingers to engage and release containers of interest, the container grabbing system being vertically pivotable on a short radius for adjusting the position of and tipping a container. A chain and cylinder drive system operates the carriage device along the lift assembly, and a control system controls operation of the container handling mechanism.

7 Claims, 10 Drawing Sheets

AUTOMATED LOADER

BACKGROUND OF THE INVENTION

I. Field of the Invention

The present invention relates generally to container handling equipment, including systems for accessing, grabbing, lifting and tipping a wide range of sizes and shapes of collection containers into charging hoppers or compartments of side loading collection vehicles, or other receptacles, and thereafter returning empty containers to their pickup locations. More particularly, the present invention relates to an automated container handling system including a container grabbing device, that is not only capable of lateral extension, but also capable of full lift and dump operation in very close quarters. A linearly-operating lift system is provided to lift and lower containers that cooperates with a pivoting, short-arm container grabbing device with hydraulic fingers. A rotary actuator pivots the grabbing device to adjust grabbing angle, tip containers and rotate it to and from a stowed position.

II. Related Art

Various vehicles dedicated to the collection of refuse or recyclables have included mechanized container handling devices that allow an operator to cause the device to access, lift, empty and return containers of interest without the need for any direct interaction by the operator so that the operator may remain in the vehicle. Such a holding or grabbing device is generally connected to an arm or extendable boom which is connected, in turn, to a base mounted on the vehicle. The arm or boom and grabbing device are operated in concert to access and engage a container of interest, lift and dump the container into a receiving hopper and return the empty container to the original location. One device of the class with an extensible boom is shown in U.S. Pat. No. 5,651,654 to Christenson and assigned to the same assignee as the present invention. Grabbing devices are also known which have opposed arms or fingers that converge around the girth of containers. Such devices generally have themselves been attached to extended arm members configured to pivot in a generally vertical plane to lift and invert a captured container and return it empty to an upright position. One such container grabbing device is illustrated and described in U.S. Pat. No. 5,769,592 to Christenson and also assigned to the same assignee as the present invention.

Systems also have been devised in which converging/diverging gripper arms are mounted on a carriage to reciprocate along a lift assembly using a chain drive or another mechanism. Such systems are disclosed in U.S. Pat. No. 5,230,393 and RE34,292. Another device is shown in U.S. Pat. No. 5,702,225 which depicts a pivoting linear lifting system operable along a pair of spaced rails. Curves in upper portions of the rails determine and control the tipping angle and radius for a captured container.

Mechanisms of known container handling devices generally have a large number of moving parts and articulated joints which are exposed to the extreme clogging and corrosive conditions of refuse collection, and, as such, tend to require frequent maintenance. It would thus be advantageous to provide a simplified mechanism to automatically operate the lift and dump arm function that reduces mechanism complexity and maintenance requirements. There is also a need to reduce the required lateral and/or vertical distance necessary for operation of such a lift and dump system so that an associated collection vehicle can successfully automate collection in narrower passages such as alleyways, or the like, in addition to emptying curb-side containers on wider streets.

SUMMARY OF THE INVENTION

By means of the present invention, there is provided a container handling or loading system, including a mechanism able to grab, lift and dump a relatively large range of sizes of refuse containers, which is particularly useful in loading refuse vehicles from the side in close quarters or narrow, confined spaces such as alleyways or the like. The container handling system of the present invention requires no more lateral distance to operate than that required for the truck to pass alongside a container of interest to be emptied. A container sandwiched between a passing truck and a wall, for example, can be automatically accessed, grabbed, lifted, dumped and returned to its original location where only minimum lateral clearance exists. The container handling mechanism of the invention also is one that can optionally move laterally with respect to a refuse truck for accessing, grabbing, lifting, dumping and returning a more laterally remote refuse container to its original location.

The system includes a pivoting lift frame assembly attachable to a refuse vehicle, a carriage device reciprocally operable along the lift frame assembly, a container grabbing and tipping system carried by the carriage device and further including a short radius rotational tipping mount and a pair of opening and converging opposed grabber arms or fingers. Operating or actuating systems operate the grabber arms and tipping mount to engage and tip a variety of sizes and shapes of containers. A carriage drive system is provided for operating the carriage device linearly along the lift assembly and a system of automatic controls is provided for controlling the operation of the container handling system.

The container lift frame assembly of the handling system as exemplified in the illustrative embodiment includes a top-pivoting, bottom-extending frame designed to be attached to a material receiving receptacle, in this case, a charging hopper of a side loading refuse vehicle. The frame includes a pair of spaced, generally parallel, side or lift support members spaced and connected by a common upper cross member. The cross member itself, in turn, spans, and is fixed to, a pair of generally vertically disposed telescoping support members designed to ride in vertical channels attached to, or integral with, the sidewall of an associated charging hopper or other receiving receptacle sought to be loaded by the container handling system of the invention.

The spaced lift support members are mounted so as to pivot in a generally vertical plane relative to the upper cross member and the lower portion of the lift support members are further pivotally attached to a bottom extending frame that includes a pair of spaced, generally parallel, laterally extendable members connected to advance and retract the lower portion of the lift support members thereby causing the upper ends of the lift support members to pivot and the vertical support members to telescope to accommodate the corresponding vertical displacement of frame members thereby accommodating the generally linear lateral displacement of the lower portions. In this manner, the associated container grabber can remain generally at the same height during lateral displacement.

A carriage system is mounted from the lift support members and carried by a drive system in a manner that enables it to traverse along the lift support members to accomplish a lifting function. The carriage system includes a rotary actuator having a double ended output including output shafts that carry and rotate spaced arm members of a yoke which, in turn, is fixed to a grabbing device for grabbing and releasing containers. The yoke mount enables the grabbing device to be pivoted or rotated generally vertically about a very short radius so as to rotate from a storage to a grabbing or deployed position in limited lateral space and also to adjust the posture of a grabbed container throughout a lift and dump cycle. The grabbing device is preferably one with opposed spaced fingers that close about a container during the grabbing function and open to release the container. The fingers are preferably operated by a compact, fully enclosed hydraulic actuating system that rotates spaced mounting shafts to open and close the fingers. The grabber fingers are designed to accommodate a wide range of container shapes and sizes.

The carriage is operated along the lift support members by a chain and cylinder mechanism that includes a pair of double-acting, double-ended hydraulic lift cylinders, each operating along a cylinder rod mounted along an associated lift support member in conjunction with a chain carried by sprockets mounted at the ends of each of the lift cylinders in coordinated fashion to operate the carriage and with it the grabber system along the lift support members to raise and lower a captured container. The rods are approximately twice the length of the cylinders. The carriage system is attached to mounts carried by the chains which are also fixed to the lift support members near the midpoints thereof in a manner that enables the carriage to travel the full length of the rods or lift support members or double the distance traveled by the lift cylinders as the chains also move the carriage a distance equal to that traveled by the cylinders.

BRIEF DESCRIPTION OF THE DRAWING

In the drawings, wherein like reference characters denote like parts throughout the same.

Figure 4:
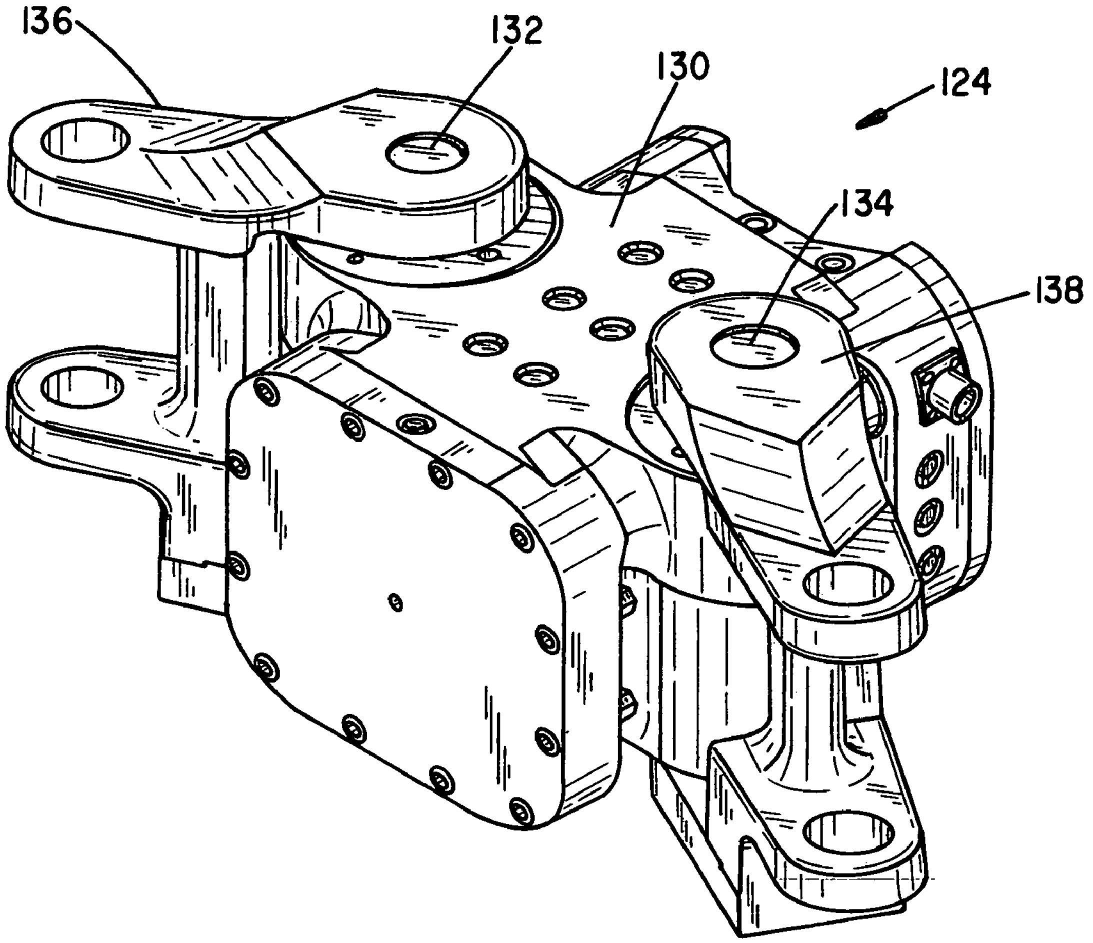
Figure 5:
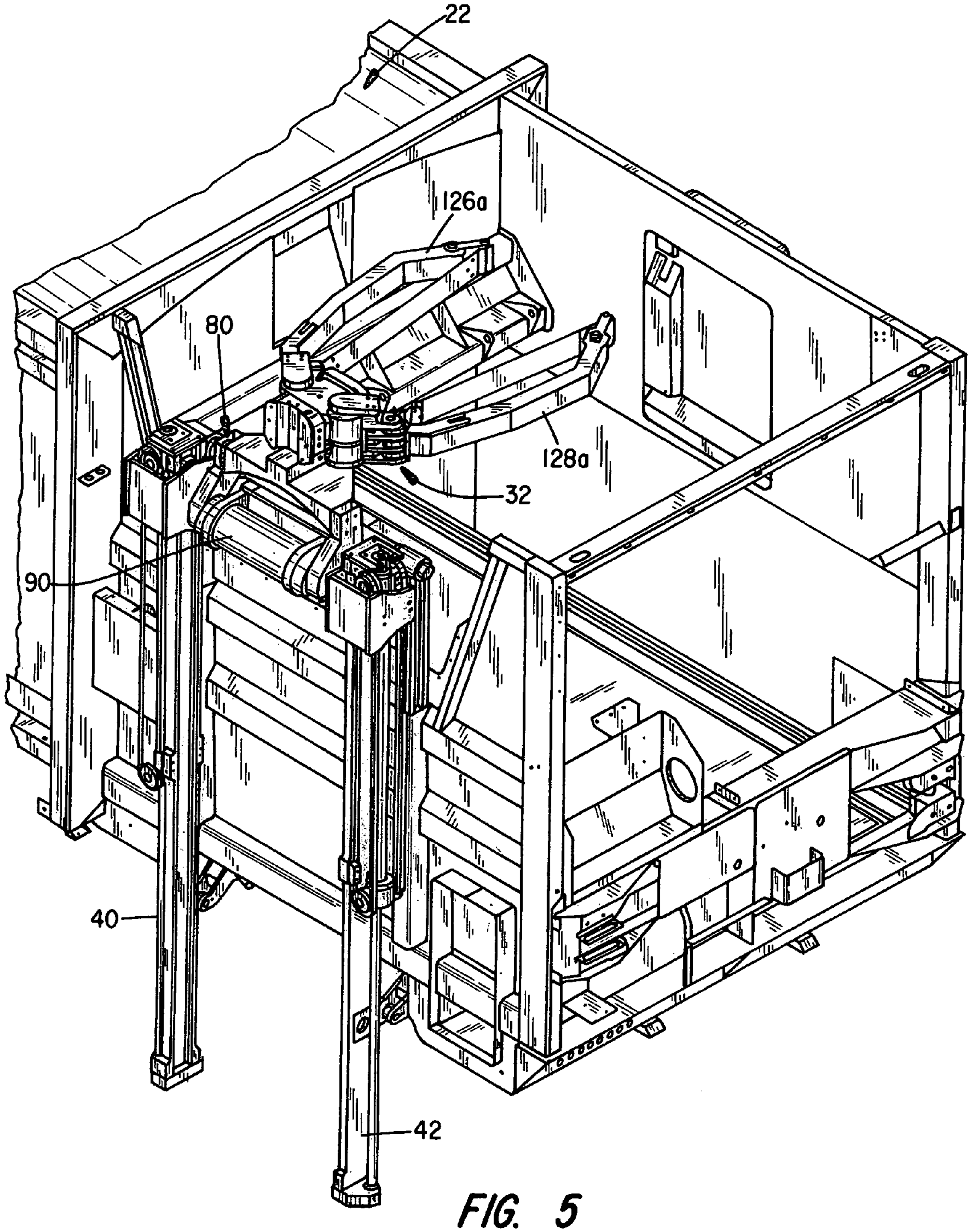
Figure 6:
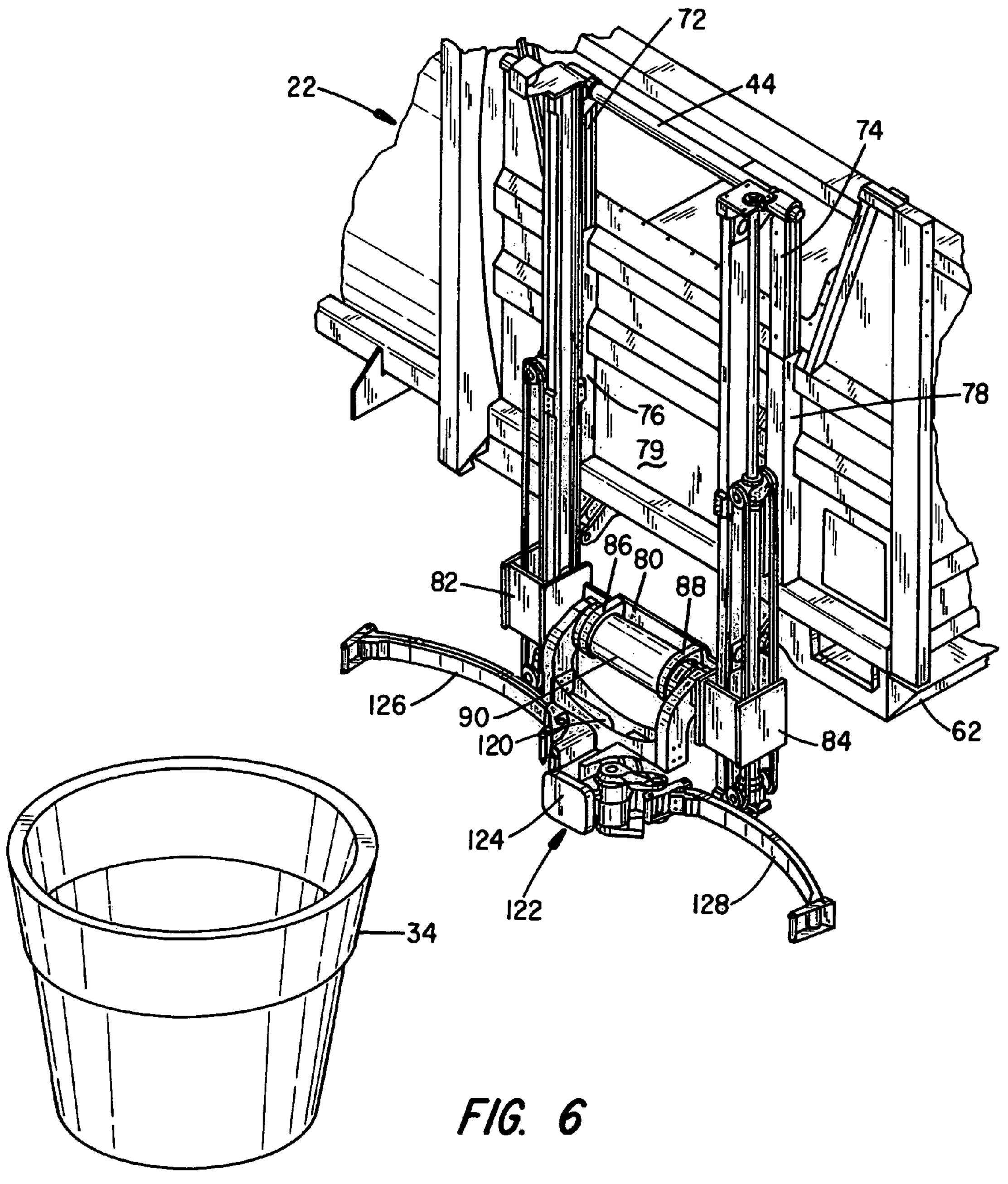
Figure 7:
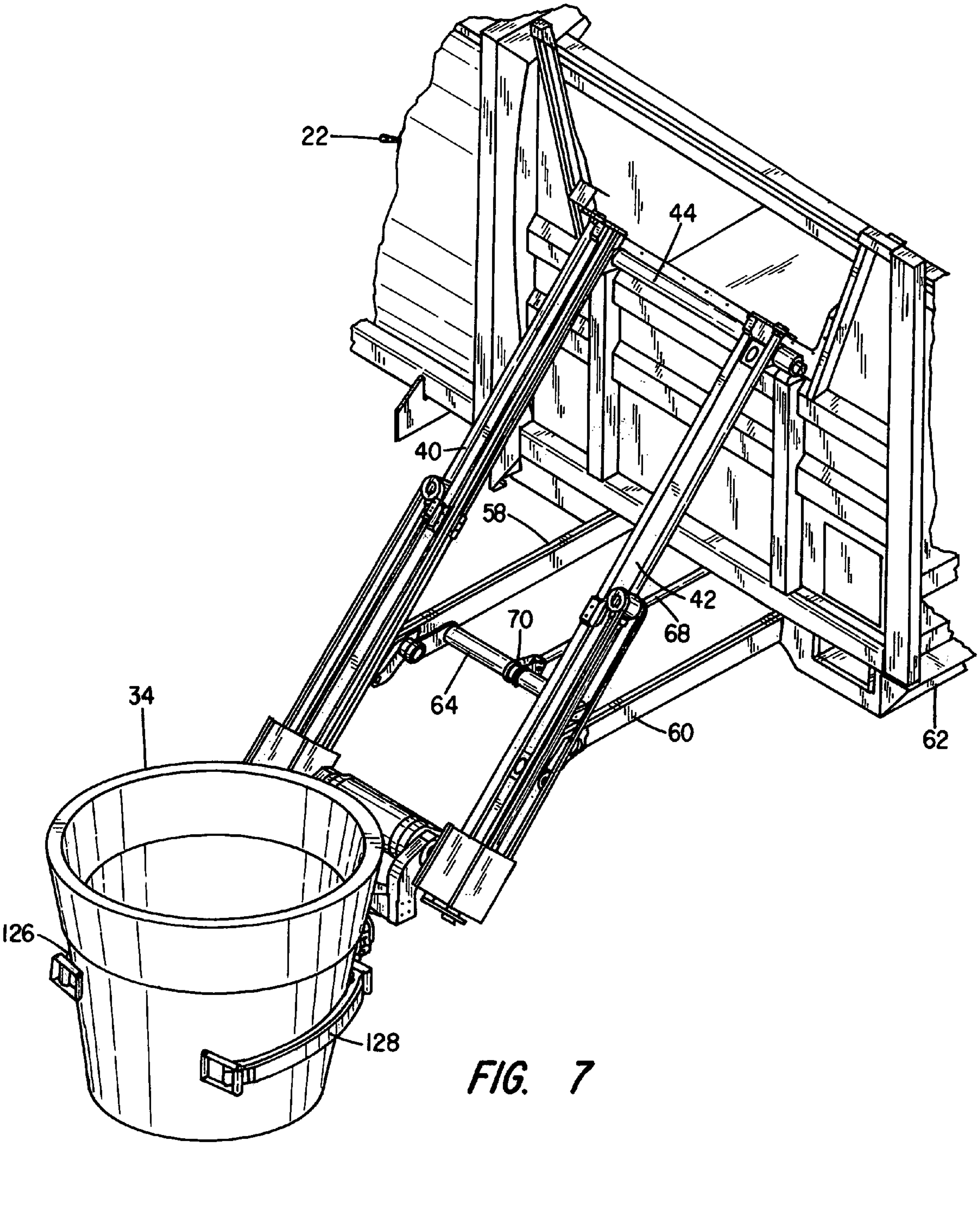
Figure 8:
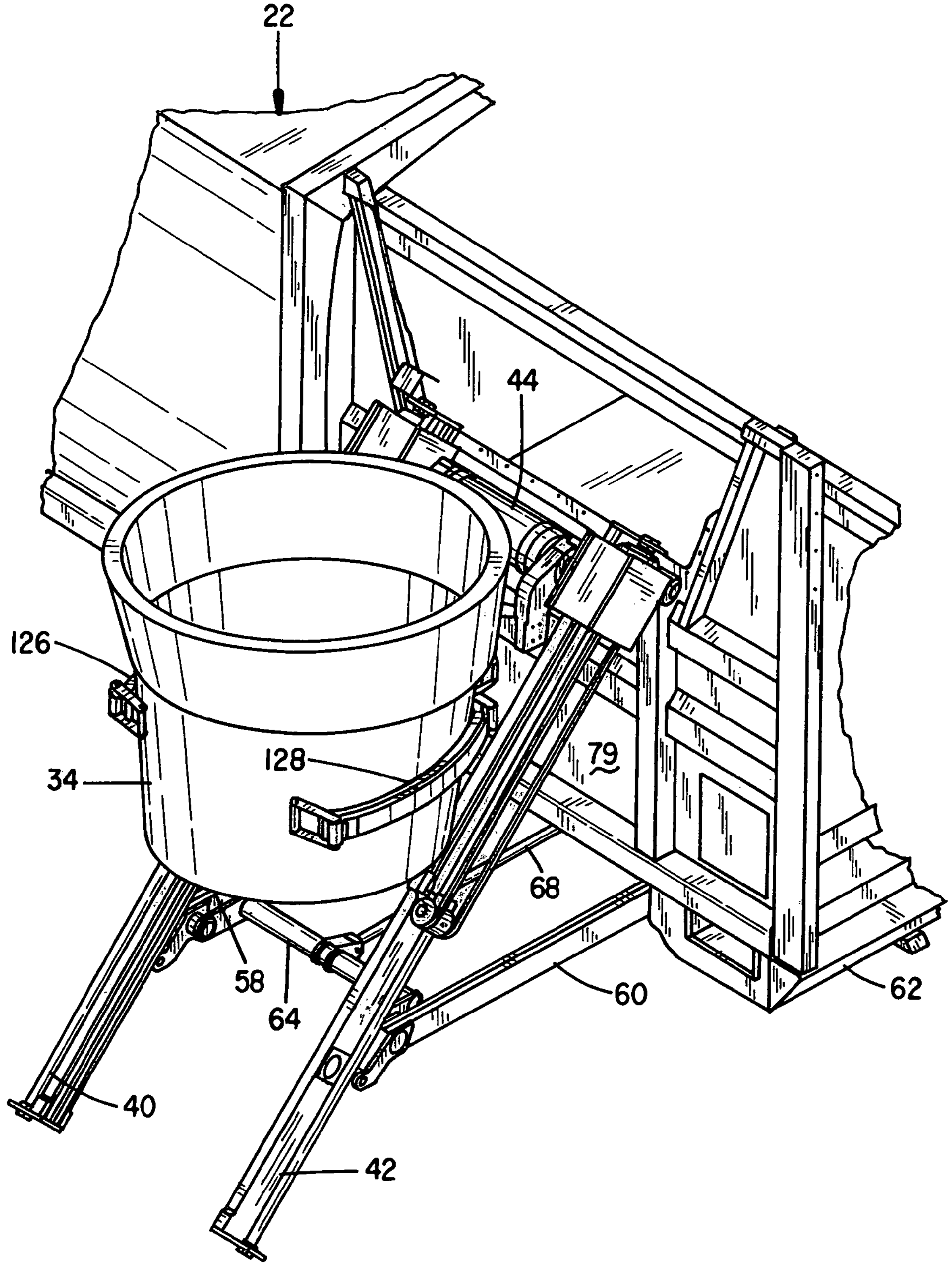
Figure 9:
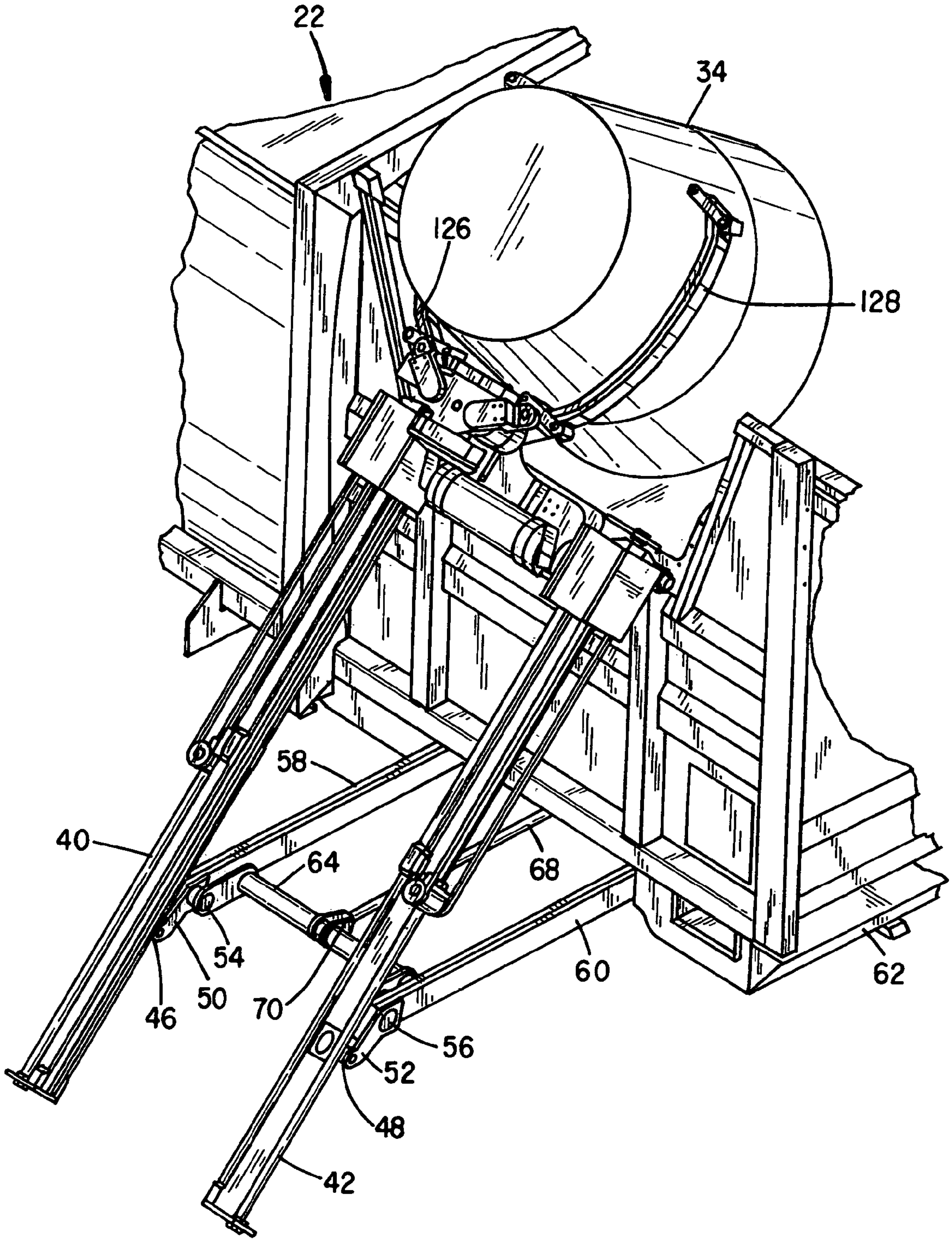
Figure 10:
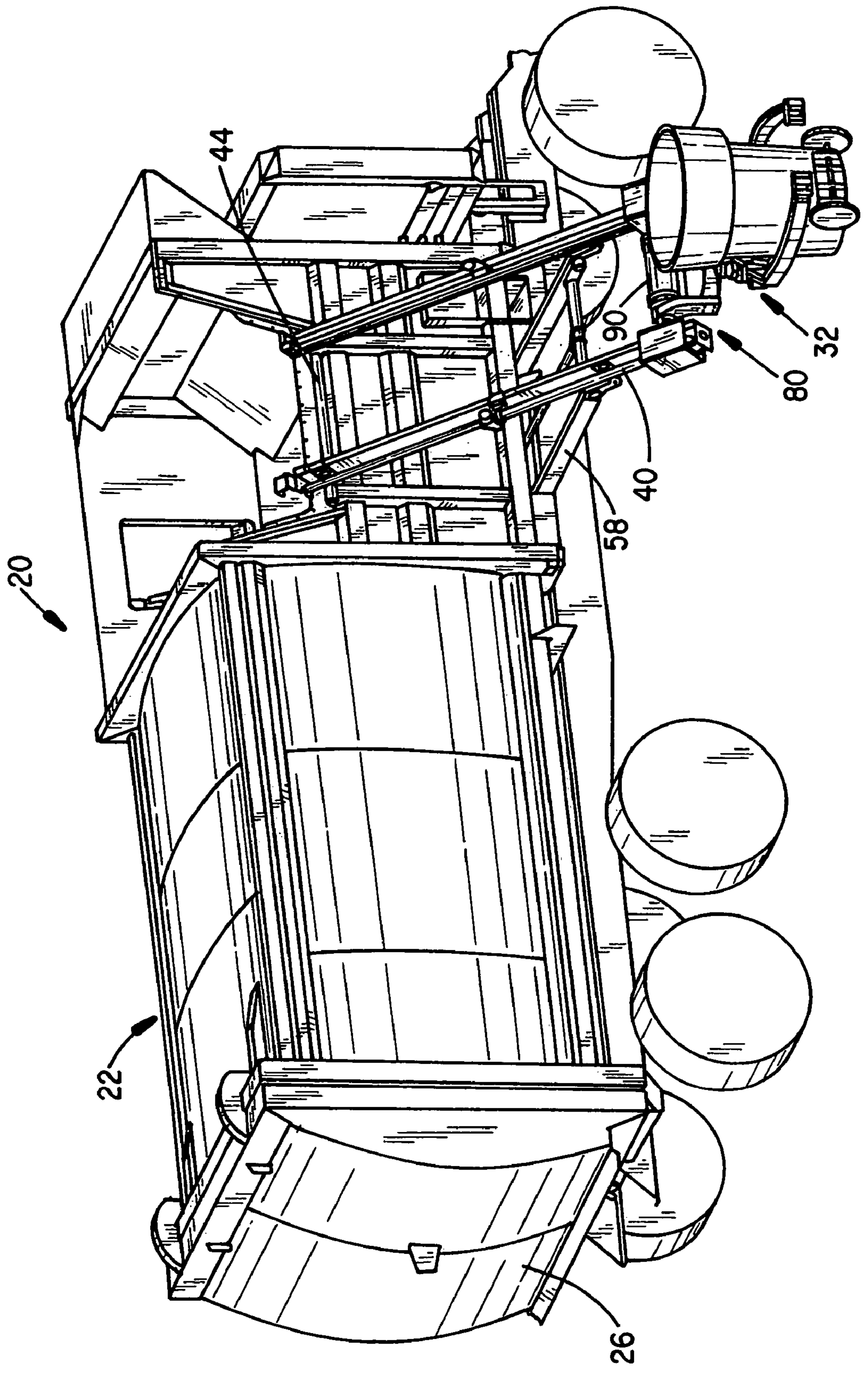

FIG*s*. 3*a*and 3*b* a chain and cylinder combination drive system associated with the raising and lowering of the carriage and grabber system along a side frame member in the equivalent of a fully lowered and fully raised position, respectively;

FIG. 4 is a greatly enlarged perspective view depicting a fully enclosed hydraulic actuating system for operating the fingers of a grabber suitable for use in the container handling system of the invention;

FIG. 5 is a fragmentary perspective view of a collection vehicle body with parts removed for clarity showing parts of a side loading receiving hopper equipped with a container handling system in accordance with the invention illustrating the container handling system in a fully retracted or stowed position;

FIG. 6 is a fragmentary perspective view of a collection vehicle body with parts removed for clarity equipped with a container handling system in accordance with the invention with the grabber lowered and rotated to a generally horizontal posture;

FIG. 7 is a view similar to FIG. 6 showing the container handling system addressing the remote container;

FIG. 8 is a view similar to FIGS. 6-7 showing the container being raised for emptying;

FIG. 9 is a view similar to FIGS. 6-8 showing the container being tipped; and FIG. 10 is a schematic perspective representation of a side loading refuse vehicle employing an embodiment of the present invention.

DETAILED DESCRIPTION

The container handling system of the present invention represents advances in the automated lifting and emptying of containers, particularly with regard to manipulating containers in close quarters and addressing a wide variety of container sizes and weights. The system enables the lifting and tipping of containers with little or no lateral room in a manner which also enables the containers to remain generally upright throughout the grabbing and lifting process until the final tipping. The system greatly reduces the need for lateral and vertical space associated the lift and tip operations.

The container handling system is able to handle containers in a wide range of sizes and shapes including large, heavy containers. For example, such a system handles anything from normal 34 gallon (129 liter) residential curb-side containers to much larger containers such as 300 gallon (1136 liter) containers weighing 1200 pounds (544.2 kg) or more. The entire operation of the system may be automated and micro-processor controlled. The detailed embodiment shown here is meant to illustrate the concepts of the invention and not to limit the scope in any manner. Variations will occur to those skilled in the art.

Figure 1:
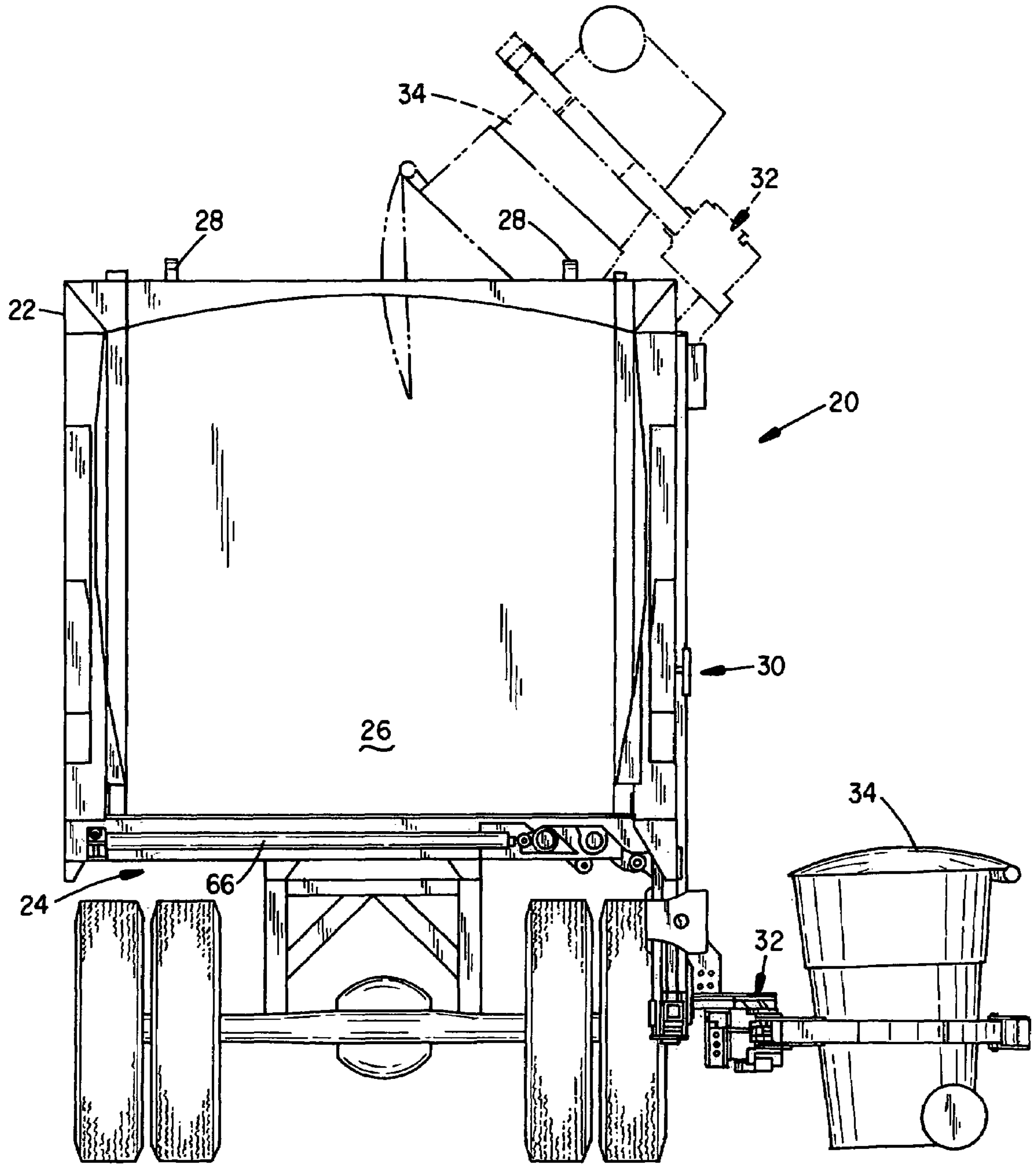
FIG. 1 is a rear elevational view partially in phantom of a side-loading vehicle equipped with the container handling system of the invention illustrating two steps in the lift and dump cycle including the accessing and dumping of a container in close quarters.

FIG. 1 depicts a rear elevational view partially in phantom of a side loading refuse truck denoted generally by the reference character 20 which represents one of several types of vehicles for which the container handling system of the present invention is particularly well suited. The vehicle includes a truck body 22 mounted on a truck chassis generally at 24. The truck body 22 is of a rear discharge type including tailgate 26, top hinged by a pair of hinges as at 28. A container handling mechanism, in accordance with the invention is depicted generally at 30 and includes a container grabber mechanism generally at 32. The grabber mechanism is shown in one position having grabbed and retrieved a container 34 and in a tipping position, shown in phantom, emptying the container 34 into a forward charging hopper of the truck body 22. In FIG. 1, the container handling mechanism is depicted with the left frame in a fully upright or vertical posture, with the lower portion of the mechanism fully retracted. This enables operation in the narrowest of quarters, as it will be noted that a container as at 34 need simply be grabbed, lifted vertically and tipped.

Figure 2:
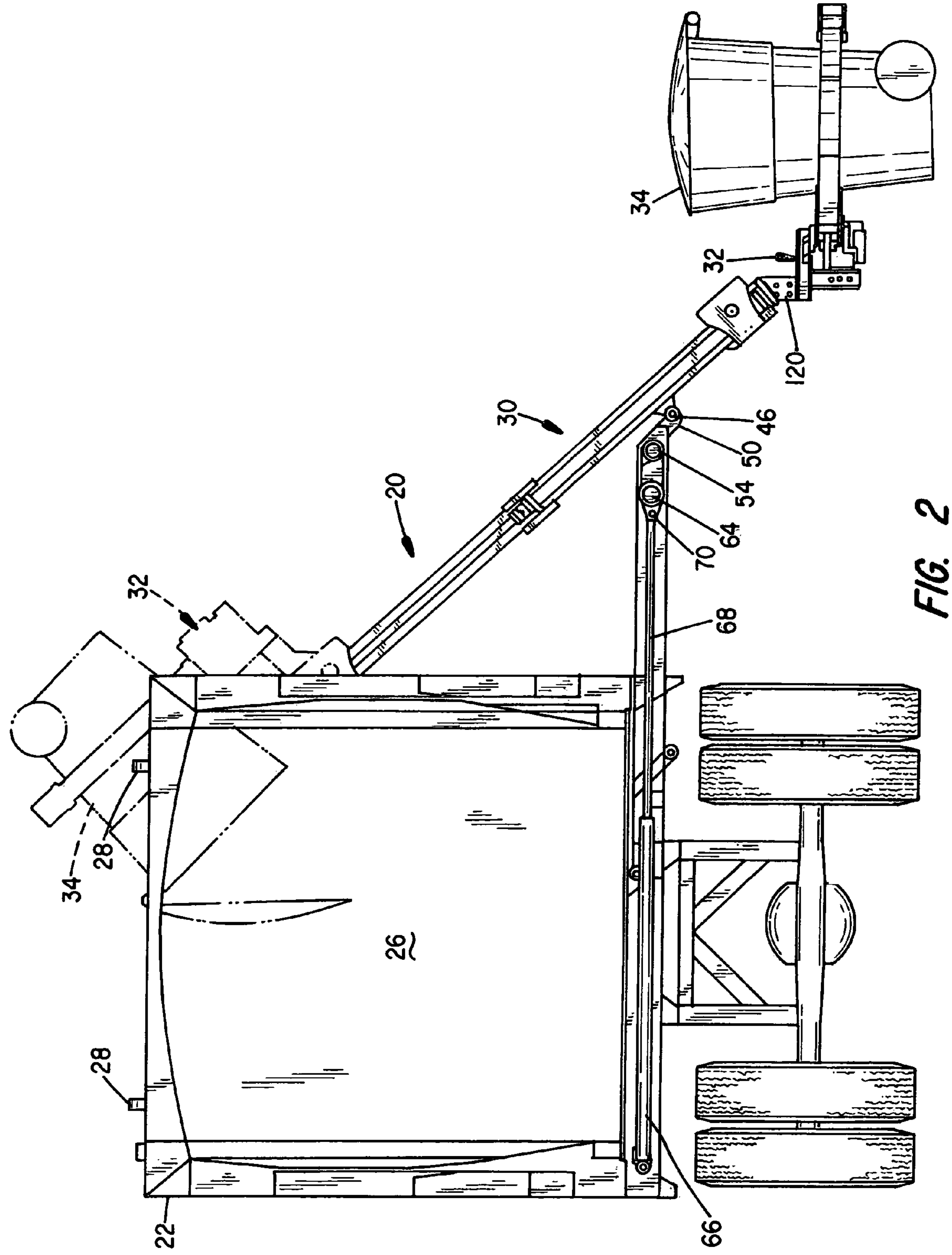
FIG. 2 is a view similar to that of FIG. 1 showing the container handling system of the invention in lateral extension demonstrating two positions including the accessing and dumping of a container of interest located a lateral distance from the side of the vehicle.

FIG. 2 is a view similar to that of FIG. 1 showing the container handling system of the invention in lateral extension accessing, or replacing, and tipping container 34 located a distance laterally away from the vehicle 20 with the tipping position again being shown in phantom.

The details of the container handling system 30 are best depicted in FIGS. 2-10. The system has a main frame that includes a pair of structural side or lift support members or structures 40 and 42 carried by an upper cross member in the form of a connecting bar 44. As best seen in FIGS. 8 and 9, the lower portions of members 40 and 42 are pivotally connected at 46 and 48, respectively, to a bottom extending frame that includes link members 50 and 52 which, in turn, are pivotally connected at 54 and 56 to a pair of spaced, generally parallel retractable lateral support structural members 58 and 60 which are generally horizontally mounted and designed to move laterally, generally parallel to the bottom 62 of the truck body 22 and are attached to be operated by an outer connecting cross member 64. The bottom extending frame is reciprocally operated laterally by a cylinder 66 (FIGS. 1 and 2) and rod 68 attached to member 64 as by a clevis or the like 70.

The upper cross member 44 connects a pair of spaced parallel members 72 and 74 (FIG. 6) which are telescopically engaged in respective generally vertical hollow shapes 76 and 78 abutting the structural sidewall 79 of the forward charging hopper of truck body 22. This allows the upper end of the main frame to move and adjust in a generally vertical direction as needed with the lateral displacement of the grabber as will be described.

Figure 3A:
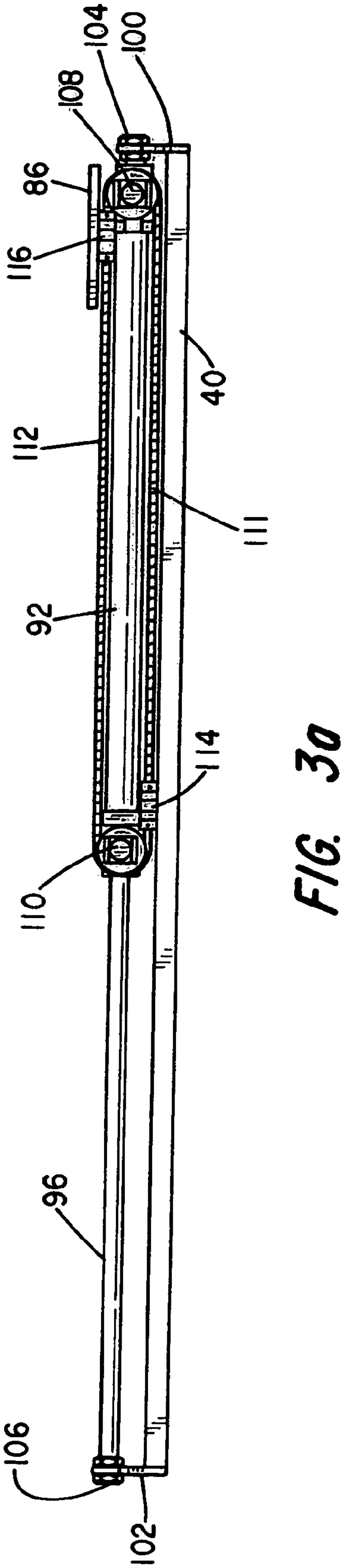
Figure 3B:
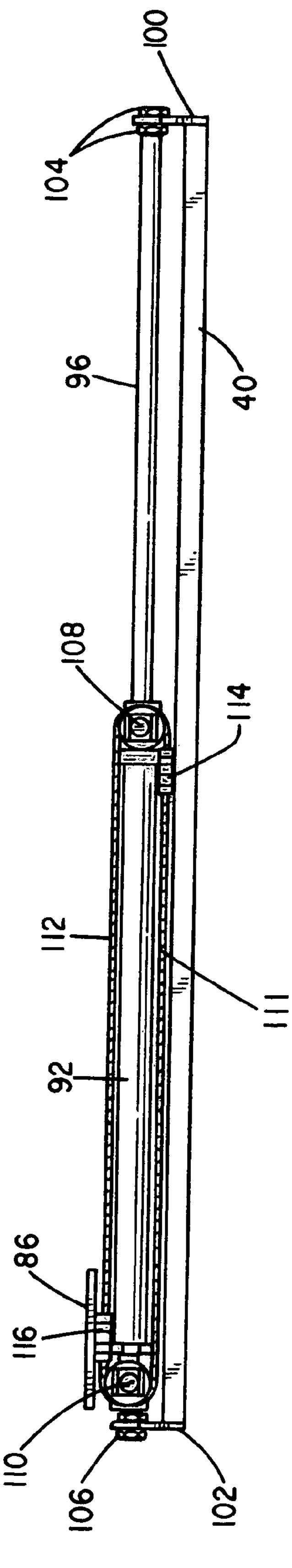

The carriage and grabber system includes a carriage device 80 that is mounted to travel along the length of structural lift support members 40 and 42 and includes a pair of housings that include plate box structures 82 and 84 and structure members 86 and 88 which support a double-ended or double-output shaft rotary actuator 90 therebetween. A lift operating system for raising and lowering the carriage system along the structural lift support members 40 and 42 is provided that includes a combination of two mechanisms, one carried by each support member, the details of which are best shown in FIG. 3. A pair of lift chain segments each having a fixed end and a traveling end and a double-acting fluid cylinder are associated with each support member 40, 42. Thus, the mechanism includes a pair of double-acting, double-ended cylinders as at 92 mounted to travel along respective cylinder rods as at 96 which extend the length of structural lift support members 40 and 42. As shown in FIG. 3, the upper and lower ends of cylinder rod 96 are connected between suitable heavy structural plates or gussets 100 and 102 fixed as at 104 and 106. The cylinder 92 is moved along the cylinder rod 96 by hydraulic fluid supplied and drained through the rod in a well known manner. A pair of chain sprockets including an upper sprocket 108 and a lower sprocket 110 are mounted on the ends of cylinder 92. Both sprockets are idler or freewheeling sprockets, and chain segments 111 and 112 are engaged around the sprockets. The chain segments 111 and 112 are connected at one end to a fixed member 114 and at the other end to a moving member 116. The member 114 is fixed to the lift support member 40 and the member 116 is fixed to plate 86 which is part of box 82 of the assembly that carries one side of the carriage 80. As the cylinder 92 moves upward, or downward, this configuration produces an additional equidistant movement of the chain segments 111 and 112 and with them the plate 86, along the cylinder, causing the plate at 86 to move a distance along the member 40 twice that moved by the cylinder as illustrated in FIG. 3. With reference to both lift support members, of course, the carriage 80 will move double the distance moved by the cylinder.

The output shafts of the double-ended rotary actuator 90 of the carriage system 80 are connected to rotate relatively short, spaced arms of a heavy yoke device 120 (FIGS. 6-9) which, in turn, is fixed to and carries grabber mechanism 122 which itself includes a totally enclosed, fluid-operated (preferably hydraulic) actuator 124 which operates a pair of opposed converging and diverging arms or grabber fingers 126 and 128 used to capture and release a container of interest. An enlarged view of the totally enclosed fluid-operated actuator 124 is shown in FIG. 4 and includes a central gear case or housing 130 and a pair of rotating output shafts 132 and 134 which, in turn, are keyed to rotate and operate a pair of connector devices 136 and 138 which, in turn, are connected, respectively, to operate the grabber fingers 126 and 128 in a manner familiar to those skilled in the art.

FIGS. 5-9 further illustrate steps in a typical sequence of operating the container handling system of the invention which illustrate accessing, grabbing, lifting and tipping a collection container. Thus, FIG. 5 depicts the illustrative embodiment of the container handling system of the invention in a fully stowed configuration with the gripper mechanism raised and rotated inward in a tipping posture. An alternate embodiment of the grabber fingers is shown at 126*a* and 128*a*. The bottom extending frame is fully retracted so that the system assumes a very narrow lateral profile abutting the side of the charging hopper of the truck body 22. A container of interest 34 is shown at a lateral distance away from the container handling system in FIG. 6. The grabber mechanism is shown rotated into a forward generally horizontal grabbing posture prior to any lateral extension of the system toward container 34. FIG. 7 shows the bottom extending frame advanced with the grabber system having engaged and closed about the container 34 prior to raising of the container. FIG. 8 shows the system with the lift operation completed and the carriage 80 at the top of the lift support members 40 and 42.

It will be appreciated that the container 34 has been maintained in an upright position throughout the grabbing and lifting sequence and is positioned for tipping. The carriage has simply moved up the incline of the frame. In FIG. 9, the short-armed grabber yoke has been rotated to tip the container 34 and empty it into the charging hopper of the refuse truck.

Tipping having been completed, a simple reversal of the steps utilized to empty the container enables the container to be returned to the exact spot where it was picked up, because the bottom-extending frame has not moved from the pickup posture. The container handling system thereafter is returned to its stowed or traveling position. The design of the system of the invention, of course, results in a container handling system which, without the need for further motion or controls, at all times, returns a container being handled to its original spot. Of course, the system also works particularly well for close-in containers without the need to extend the bottom extending frame, as illustrated in FIG. 1, enabling the emptying of containers of interest in very close quarters wherein the container is simply grabbed and lifted vertically and tipped.

An important aspect of the container handling system of the invention involves in the ability of the system to unload containers in a wide variety of sizes. Thus, the system is designed to grab, lift and dump any container size between about 34 gallons (129 liters)and up to even very large and heavy containers up to about 300 gallons (1136 liters) weighing #1200 lbs (544.2 kg) or more with the grabber fingers enabled to seize a container in such a wide range of sizes without slipping or crushing. This is because the need for elongated arms or other cantilevered parts has been eliminated. While the system is able to grab, lift and dump containers of this wide range of sizes in narrow spaces like alleys, it may also reach such containers where the distance from the side of the truck to the center of the container is up to 8 feet (2.44 meters) or more in one model. The cycle time can be quite rapid for the container handling system of the invention inasmuch as there is no need to retract an arm (or the access and lift frame) in order to lift and invert the container or re-extend the arm (or the access and left frame) to return the container to its original site.

FIG. 10 shows a schematic perspective representation of a side loading refuse vehicle including an embodiment of the present invention in full lateral extension. This represents the lowest vertical position for unloading.

This invention has been described herein in considerable detail in order to comply with the patent statutes and to provide those skilled in the art with the information needed to apply the novel principles and to construct and use such specialized components as are required. However, it is to be understood that the invention can be carried out by specifically different equipment and devices, and that various modifications, both as to the equipment and operating procedures, can be accomplished without departing from the scope of the invention itself.

What is claimed is:

1. A container handling system mounted on the side of a receptacle suitable for operating in close quarters for accessing, grabbing, lifting, tipping and returning refuse or other containers, comprising:

(a) a laterally pivoting lift assembly designed to be fixed to a side of a refuse vehicle charging hopper or other receptacle and having a pair of spaced, generally parallel lift support members, each support member having a fixed upper end pivotally mounted to a fixed top mount member and a lower free portion connected to a lateral adjustment frame assembly so that lateral pivotal adjustment is occasioned by linear travel of said lateral adjustment frame to pivot said lift support members;

(b) said lateral adjustment frame further comprising a pair of spaced parallel lateral support members connected to said lift support members and to a common cross-member which, in turn, is connected to a fluid cylinder mechanism for moving the lower portions of said lift support members laterally;

(c) a carriage device carried by and reciprocally operable along said lift support members of said lift assembly;

(d) a container manipulating assembly carried by said carriage device and further comprising (1) a container grabbing assembly comprising opposed grabbing fingers and an actuator system for closing and opening said grabber fingers to engage and release a container;

(2) a rotary actuator including a short-armed yoke connected to generally vertically pivot said container grabbing assembly;

(e) a carriage drive system for operating said carriage device along said lift support members and including a pair of mechanisms, each mechanism including a fixed cylinder rod, a traveling fluid-operated cylinder operable along said rod and an associated fixed chain, one of said mechanisms being mounted along each of said lift support members and configured such that said carriage travels a greater distance than said cylinders; and (f) a control system for controlling operation of said container handling system.

2. A container handling system as in claim 1, wherein said carriage is carried balanced by and between a pair of members, one attached to each chain of said combined chain and cylinder mechanisms.

3. A container handling system as in claim 2, wherein said pair of mechanisms includes an arrangement wherein:

(a) each said cylinder rod is fixed to one of said lift support members such that when actuated, cylinder moves along a fixed rod; and (b) each said associated chain being in the form of a loop of chain carried by said cylinder on spaced sprockets, said loop of chain being fixed to said lift support member at one point and to said carriage at another point such that reciprocal movement of said cylinder also causes said associated chain loop to move said carriage relative to said cylinder an additional equivalent distance.

4. A container handling system as in claim 1, wherein said pair of mechanisms includes an arrangement wherein:

(a) each said cylinder rod is fixed to one of said lift support members such that when actuated, cylinder moves along a fixed rod; and (b) each said associated chain being in the form of a loop of chain carried by said cylinder on spaced sprockets, said loop of chain being fixed to said lift support member at one point and to said carriage at another point such that reciprocal movement of said cylinder also causes said associated chain loop to move said carriage relative to said cylinder an additional equivalent distance.

5. A container handling system as in claim 1, wherein said rotary actuator is a double-ended rotary actuator.

6. A container handling system as in claim 1, wherein said container grabbing assembly includes an enclosed hydraulic actuator system for closing and opening said grabber fingers.

7. A container handling system as in claim 1, wherein said container handling system is fixed to the charging hopper of a side-loading refuse vehicle.

* * * * *